United States Patent
Karia et al.

(10) Patent No.: US 11,621,845 B2
(45) Date of Patent: Apr. 4, 2023

(54) RESOLVING COMPLAINTS

(71) Applicant: International Business Machines Corporation, Armonk, NY (US)

(72) Inventors: Jignesh K Karia, Thane (IN); Vishal Awal, Mumbai (IN); Jitan S Chandanani, Mumbai (IN); Rahul Hundet, Hyderabad (IN); Dayama Pankaj Satyanarayan, Bangalore (IN); Neha Shah, Kolkata (IN); Arindam Dasgupta, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 347 days.

(21) Appl. No.: 17/113,362

(22) Filed: Dec. 7, 2020

(65) Prior Publication Data

US 2022/0182238 A1     Jun. 9, 2022

(51) Int. Cl.
| | |
|---|---|
| H04L 29/06 | (2006.01) |
| H04L 9/32 | (2006.01) |
| G06F 16/27 | (2019.01) |
| H04W 4/06 | (2009.01) |
| H04W 4/12 | (2009.01) |
| G06F 16/23 | (2019.01) |
| G06Q 50/26 | (2012.01) |
| G06Q 30/0251 | (2023.01) |

(52) U.S. Cl.
CPC ........ *H04L 9/3218* (2013.01); *G06F 16/2379* (2019.01); *G06F 16/27* (2019.01); *H04L 9/3239* (2013.01); *H04W 4/06* (2013.01); *H04W 4/12* (2013.01); *G06Q 30/0267* (2013.01); *G06Q 50/265* (2013.01)

(58) Field of Classification Search
CPC ... H04L 9/3218; H04L 9/3239; H04L 51/214; H04L 9/50; H04L 51/212; G06F 16/2379; G06F 16/27; H04W 4/06; H04W 4/12; G06Q 30/0267; G06Q 50/265
See application file for complete search history.

(56) References Cited

U.S. PATENT DOCUMENTS

| | | | |
|---|---|---|---|
| 2017/0034470 A1* | 2/2017 | Kleinrock | .......... H04N 5/23238 |
| 2019/0372770 A1 | 12/2019 | Xu et al. | |
| 2020/0186355 A1* | 6/2020 | Davies | ...................... H04L 9/50 |
| 2020/0311695 A1* | 10/2020 | Cao | ...................... G06Q 20/389 |
| 2022/0353455 A1* | 11/2022 | Kleinrock | ............... H04L 67/01 |

(Continued)

OTHER PUBLICATIONS

Triyanto, H., "Customer Consent as a Critical Point in Customer-Centric Strategy: Challenges and the Future of the Asia/Pacific Financial Services Industry", Aug. 2019—Tech Buyer Presentation, Abstract Only, printed Jun. 15, 2020, 3 pages.

(Continued)

*Primary Examiner* — Mahfuzur Rahman
(74) *Attorney, Agent, or Firm* — Donald J. O'Brien

(57) ABSTRACT

Embodiments are disclosed for a method. The method includes generating a zero-knowledge proof that proves that a hash of the scrubbed plurality of mobile telephone numbers is computed correctly in response to a complaint about a message. The method also includes generating a zero-knowledge proof that proves that the message maps to the specific template identifier in response to a complaint about the message.

20 Claims, 9 Drawing Sheets

(56) References Cited

U.S. PATENT DOCUMENTS

2022/0392004 A1* 12/2022 Maurer .............. G06F 16/2365
2022/0417028 A1* 12/2022 Zilbershtein ........ H04L 63/0442

OTHER PUBLICATIONS

Taori et al., "A Decentralized, Distributed Approach for Unsolicited Commercial Communication", Information Security Research & Development Center, Bombay, Jan. 28, 2019, 8 pages.
Bhawan, M., "Consultation Paper on Unsolicited Commercial Communication", Sep. 14, 2017, 81 pages.
Kumar, S., "Comments on the Telecom Commercial Communications Customer Preference Regulations", printed Mar. 13, 2020, 9 pages.
Gupta, P., "Use of Distributed Ledger Technology to control Unsolicited Commercial Communication", 24 pages.
Mell et al., "The NIST Definition of Cloud Computing", Recommendations of the National Institute of Standards and Technology, Sep. 2011, 7 pages.

\* cited by examiner

RESOLVING COMPLAINTS

BACKGROUND

The present disclosure relates to complaints, and more specifically, to privacy preserving consent management and resolving complaints.

Telecommunication service providers (service providers) may have legal, ethical, and other obligations in the operation of their networks that concern the privacy of, and reducing unsolicited commercial communications (UCC) to, their customers (subscribers). In fact, service providers can be legally obligated to have customer consent for communications. Without the subscriber's consent, services can be obligated to deny communication, specifically a communication to the subscriber.

Additionally, service providers may have legal obligations to be able to prove to a government regulator that the service provider has their subscribers' consent to deliver the communications to their subscribers. Accordingly, consent management can involve service providers determining whether the customer has given consent to receiving communications delivered by the service provider over the service providers' networks. When a subscriber complains about receiving an unsolicited commercial communication, complaint handling can involve proving to a regulator that the service provider has customer consent for each communication delivered on their networks.

SUMMARY

Embodiments are disclosed for a method. The method includes generating a zero-knowledge proof that proves that a hash of the scrubbed plurality of mobile telephone numbers is computed correctly in response to a complaint about a message. The method also includes generating a zero-knowledge proof that proves that the message maps to the specific template identifier in response to a complaint about the message.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
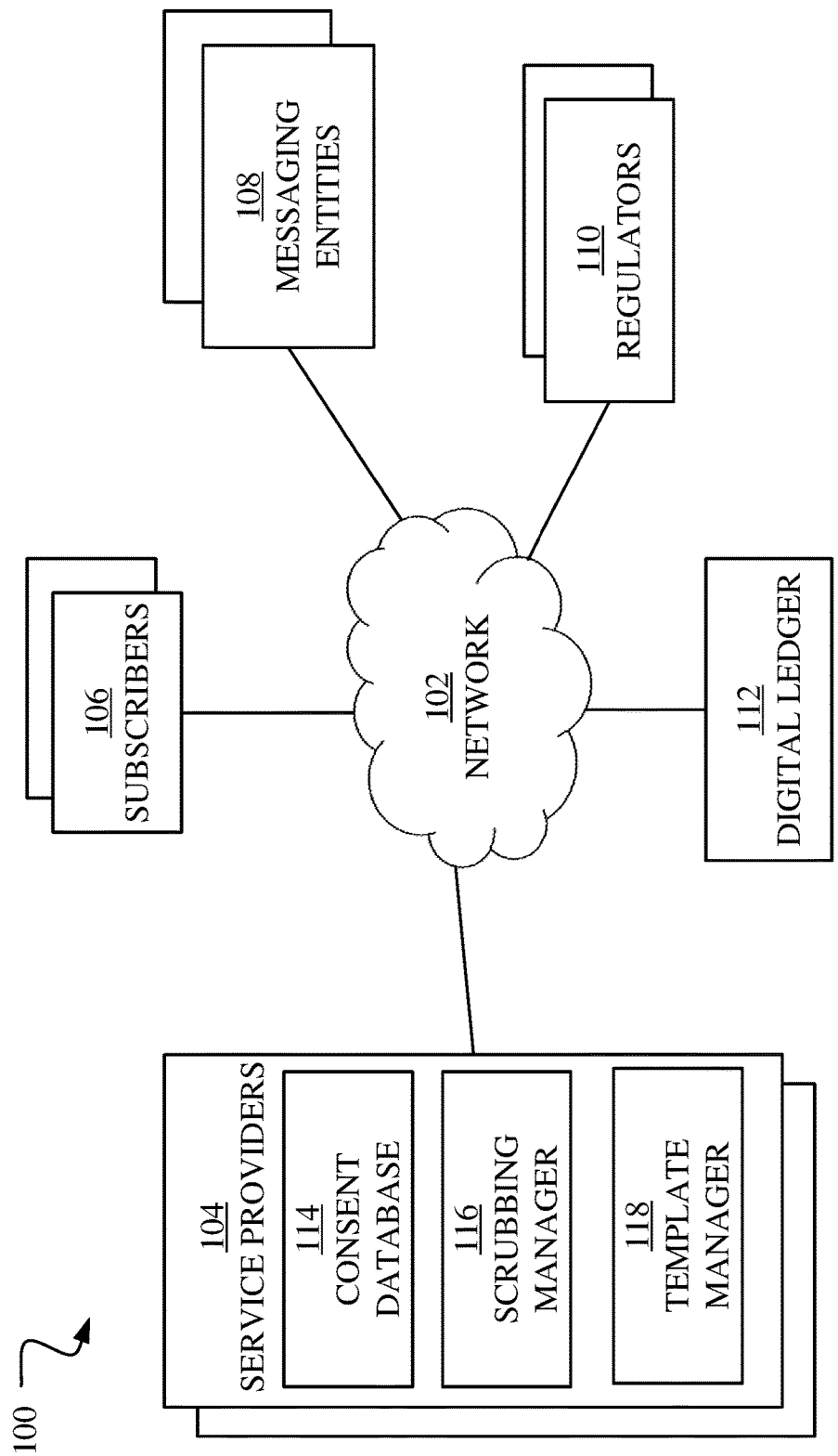
FIG. 1 is a block diagram of an example system for privacy preserving consent management and complaint handling, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, consent management can involve determining whether a service provider's subscribers have given consent to receiving communications delivered by the service providers' networks. Further, complaint handling can involve proving to a regulator that the service provider has customer consent for such communications. Potential recipients of the text message can grant prior consent to receiving such solicitations. An originating access provider (OAP) can capture consent for a given message sending entity and category. Further, the message sending entity can register a content template for sending communications with the service provider of its choice. The template can include static content and dynamic content. Accordingly, a telemarketer, for example, can send a commercial solicitation to multiple recipients in a text message to a telecommunication service provider (service provider) with an identifier (ID) for the template. This receiving service provider can validate the template ID, and provide the message, template ID, and proof of the template ID validation to a service provider for the telemarketer, the OAP. Further, the OAP has an obligation to ensure consent laws are enforced.

Computer systems for consent management and complaint resolution can use a proof of scrubbing technique to validate customer consent. When the receiving service provider sends the information described above to the OAP, the OAP "scrubs" the list of mobile telephone numbers. In other words, the OAP uses a digital ledger to determine whether the telemarketer has consent from the recipients for each of the mobile telephone numbers. The OAP "scrubs", i.e., removes, the mobile telephone numbers from the group that do not give consent.

Proof of scrubbing can involve a clear text validation of the consent, using a digital ledger, such as blockchain. However, performing proof of scrubbing for the purpose of complaint handling can publicly reveal private data that could lead to potentially unsolicited communications. Targeted marketers can thus exploit private data that may reveal usage patterns of telecommunication customers that marketers may exploit. For example, a targeted marketer can use this data to know the customer preference for certain brands, and sell the customer's details to the competitors of the brand. Additionally, a targeted marketer can sell the private data to unregistered telemarketers, who can then call the customer to try and sell their services and/or products. In some cases, individual unregistered telemarketers can call mobile phone subscribers without their consent with commercial product offers.

Accordingly, embodiments of the present disclosure can provide proof of scrubbing for a template communication without revealing consent information that includes private data. In such embodiments, an originating access provider that sends the communication can perform a scrubbing of a subscriber list. Additionally, some embodiments of the present disclosure can provide a proof of scrubbing to the terminating access provider that delivers the communication to the subscriber. Further, some embodiments of the present disclosure can provide zero knowledge proofs in response to a complaint that prove the scrubbing is done correctly and that the subscriber gives consent for an associated template of the template communication. Advantageously, the originating access provider can provide this proof without revealing private data. In this way, embodiments of the present disclosure can help preserve privacy in consent management and complaint handling. Zero knowledge proofs are a cryptographic tool that enables a first party to prove to a second party that the first party knows a value, e.g., x, without conveying any additional information.

FIG. 1 is a block diagram of an example system 100 for privacy preserving consent management and complaint handling, in accordance with some embodiments of the present disclosure. The system 100 includes a network 102, service providers 104, subscribers 106, messaging entities 108, regulators 110, and digital ledger 112. The network 102 may be a local area network, wide area network, or collection of computer communication networks that facilitates communication between components of the system 100, specifically, between the service providers 104, subscribers 106, messaging entities 108, and regulators 110. In some embodiments, the network 102 can be the Internet.

The service providers 104 can be telecommunication service providers that provide access to telephone and related communications services. The subscribers 106 can be customers of the service providers 104, to whom the service providers 104 provide communication service access. The messaging entities 108 can be organizations, such as businesses, that send messages to subscribers 106 through the service providers 104. However, the service providers 104 may have legal obligations to not deliver messages to subscribers 106 without subscriber consent. Accordingly, regulators 110 can be government entities that take complaints from subscribers 106 about unsolicited commercial communications (UCC) and investigate whether specific messages about which subscribers 106 complain was sent with consent. The digital ledger 112 can be an electronic ledger system, such as Blockchain®.

According to some embodiments of the present disclosure, the service providers 104 can include a consent database 114, scrubbing manager 116, and template manager 118. The consent database 114 can indicate whether the service provider's subscribers 106 gives consent to various messaging entities 108 to send UCC to the subscribers 106. In this respect, the service provider 104 can represent a custodian of the subscribers' consent, which is useful to a service provider's customer-centric strategy. In this regard, the subscriber's consent is similar to a currency that is protected per government regulations. Accordingly, the digital ledger 112 can provide auditable records of the use of subscriber consent. Further, regulation can implicate privacy obligations on the part of the service provider 104. Accordingly, in some embodiments of the present disclosure, the scrubbing manager 116 can enable automated resolution of complaints related to UCC by proving compliant execution of scrubbing process without revealing any private data. More specifically, the scrubbing manager 116 can generate a zero knowledge proof (ZKP) of correct execution of the scrubbing process consistent with the state of the digital ledger 112 at the time of scrubbing. In this way, the regulators 110 can verify the proof and resolve the complaint without getting access to any private data used by the service providers 104.

The template manager 118 can map received messages to a template ID for proving consent. Additionally, the template manager 118 can generate a zero knowledge proof for correct mapping of the template message to a specific template.

Figure 2:
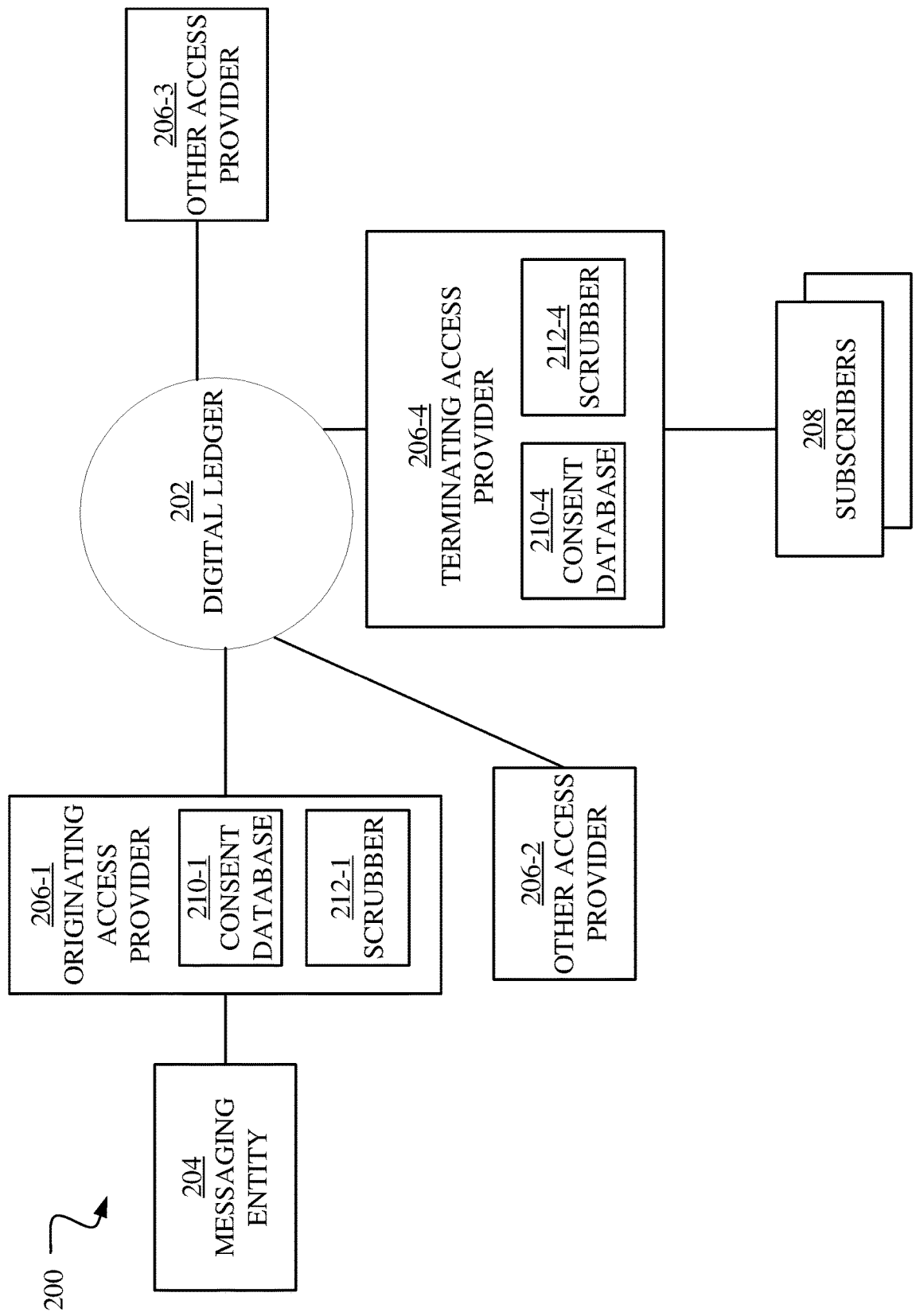
FIG. 2 is a process flow diagram of an example system for privacy preserving consent management and complaint handling, in accordance with some embodiments of the present disclosure.

FIG. 2 is a block diagram of an example system 200 for privacy preserving consent management and complaint handling, in accordance with some embodiments of the present disclosure. The example system 200 includes digital ledger 202, messaging entity 204, access providers 206, and subscribers 208.

The digital ledger 202 is similar to the digital ledger 112 described with respect to FIG. 1. The messaging entity 204 is similar to the messaging entities 108. The access providers 206 are similar to the service providers 104. Additionally, the subscribers 208 are similar to the subscribers 106.

Additionally, the access providers 206 include originating access provider 206-1, other access providers 206-2, 206-3, and terminating access provider 206-4. The originating access provider 206-1 and terminating access provider 206-4 include, consent databases 210 and scrubbers 212. The originating access provider 206-1 can be the service provider with whom the messaging entity 204 has a communication services, e.g., subscriber, relationship. Mappings between messaging entities 204 and access providers 206 can be available over the digital ledger 202 in a global, i.e., public, channel. Similarly, the terminating access provider 206-4 can be the service provider with whom the subscribers have communication service relationships.

The consent databases 210 and scrubbers 212 are similar to the consent database 114 and scrubbing manager 116. For clarity, the detail of originating access provider 206-1 and terminating access provider 206-4 are shown, but not other access providers 206-2, 206-3. However, other access providers 206-2, 206-3 can also include such elements.

According to some embodiments of the present disclosure, the messaging entity 204 can provide proof of consent to the originating access provider 206-1. The proof of consent can indicate that specific subscribers 208 consent to receiving communications from the messaging entity 204. The access providers 206 can verify the subscribers' consent using the digital ledger 202, and store proof of the subscribers' consent in consent database 210-1. Both the originating access provider 206-1 and the terminating access provider 206-4 can store the consent information in their local consent databases 210.

Accordingly, the messaging entity 204 can generate a communication for multiple subscribers 208, and provide the communication, a header ID, and a list of contact information, e.g., mobile telephone numbers, to an access provider 206. While the system 200 shows the messaging entity 204 connected with a line to the OAP 206-1, the OAP 206-1 may not be the access provider that receives the message. Regardless, the receiving access provider in this case can map a header ID of the message to a template ID. Additionally, the receiving access provider can provide the message, the template ID, the list of telephone numbers, and proof of the template ID mapping to the OAP 206-1. In some embodiments of the present disclosure, the receiving service provider can store the proof on the digital ledger 202.

At the OAP 206-1, the scrubber 212-1 can perform a verifiable scrubbing process on the list of mobile telephone numbers without providing other service providers access to the consent data and/or consent database 210-1. In some embodiments of the present disclosure, the scrubber 212-1 can commit the consent data to the digital ledger 202 using consent hashing with private randomness for each access provider 206. Additionally, the subscribers 208 can provide verification of consent to the terminating access provider 206-4, which can verify the proof of consent from the messaging entity using the digital ledger 202 and store the verification in the consent database 210-4. Further, in response to a complaint from a subscriber 208, the scrubbers 212 can provide zero knowledge proofs for proving the integrity of the consent hashing computation. The other access providers 206-2, 206-3 can participate in forwarding the communication to the terminating access provider 206-4. Accordingly, the originating access provider 206-1 can provide proof of scrubbing to the other access providers 206-2, 206-3, which provide the proof of scrubbing to the terminating access provider 206-4.

Figure 3:
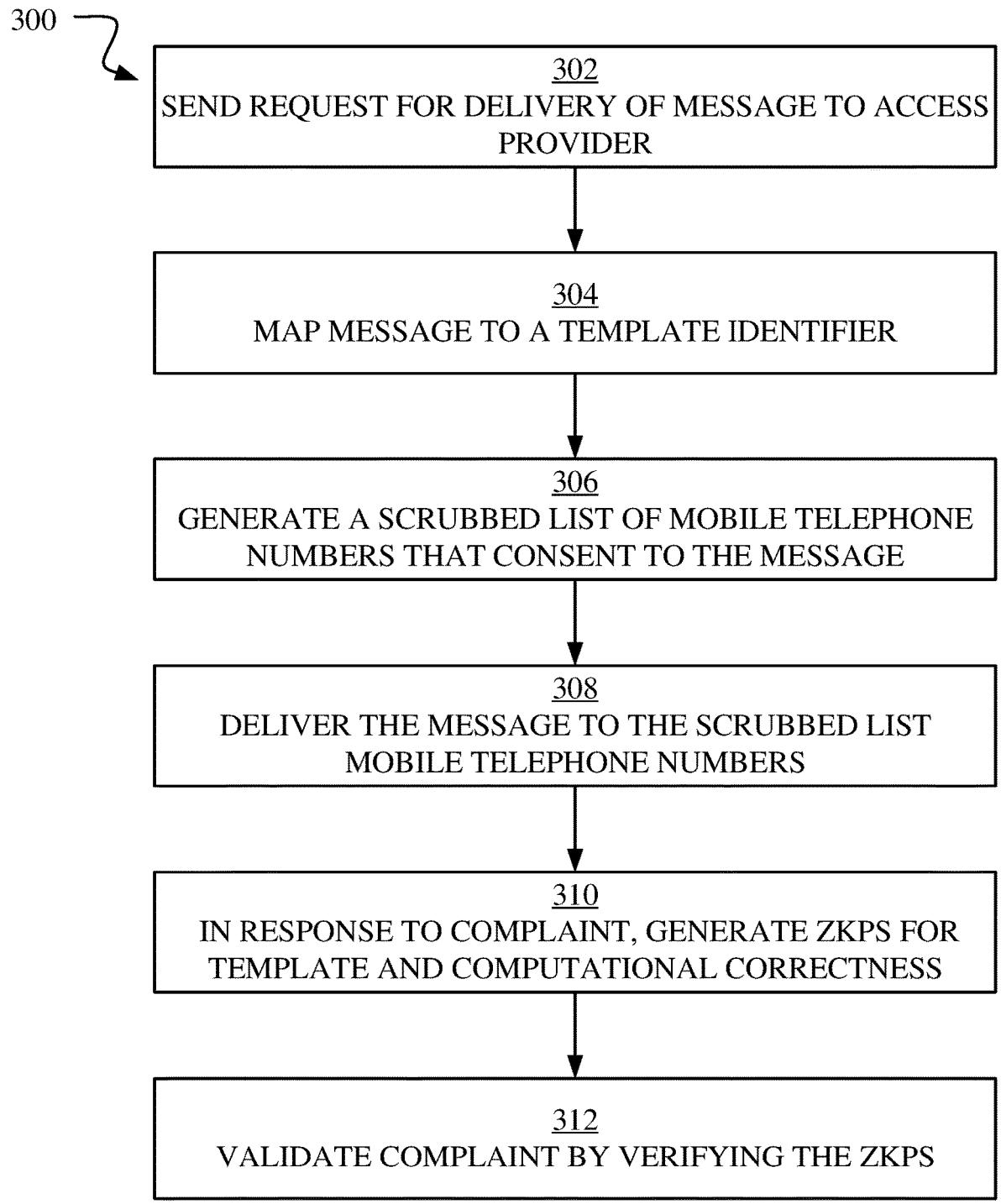
FIG. 3 is a process flow diagram of an example method for privacy preserving consent management and complaint handling, in accordance with some embodiments of the present disclosure.

FIG. 3 is a process flow diagram of an example method 300 for privacy preserving consent management and complaint handling, in accordance with some embodiments of the present disclosure. The template manager 118, messaging entity 204, access providers 206, scrubbers 212, and regulators 110 described with respect to FIGS. 1 and 2 can perform the method 300 in accordance with some embodiments of the present disclosure.

At operation 302, the messaging entity 204 can send a request for delivery to an access provider 206. The request for delivery can be to deliver a template message to a set of mobile telephone numbers. A template message can refer to the template identifier (ID) of a short message series (SMS) text message. If the template ID designated by the SMS text message does not match the template ID designated in the consent database 210-1 for a mobile telephone number, there is no consent.

At operation 304, the template manager 118 of the receiving access provider can map the message to a template ID. This mapping of message to template ID may involve parsing the message to identify the static and dynamic parts, and performing a database lookup for the static part to get the template ID. If the message maps to the correct template ID, the receiving access provider can send the message, template ID, and proof of template mapping to the OAP 206-1.

At operation 306, the scrubber 212-1 of the OAP 206-1 can generate a scrubbed list of mobile telephone numbers that consent to the message. The scrubber 212-1 can generate the scrubbed list by scrubbing the set of mobile telephone numbers for the template message. Scrubbing can involve determining which of the mobile telephone number subscribers have given consent to receive the template message. In some embodiments of the present disclosure, the digital ledger 202 can include a smart contract to identify the subset that has provided consent. A smart contract can include logic that matches the hash commitment done by the OAP 206-1 with the consent data to identity a subset of numbers who have provided consent for a given template IDS. Scrubbing is described in greater detail with respect to FIG. 4.

At operation, 308, the access providers 206 can deliver the communication to the scrubbed mobile telephone numbers. In other words, the originating access provider 206-1 can send the communication to the terminating access providers, e.g., TAP 206-4, for the mobile telephone numbers in the scrubbed list. Additionally, the terminating access provider 206-4 can deliver the communication to the subscribers 208.

At operation 310, in response to a complaint, the template manager 118 of the receiving service provider and the scrubber 212-1 can generate zero knowledge proofs, respectively, for the template mapping and computational correctness, i.e., the proof of scrubbing. The complaint can include details such as the SMS text message body, the mobile telephone number, an identifier of the OAP 206-1, and scrubbing logic (in the form of code). The scrubbing logic can include a special hash of existing templates.

In some embodiments of the present disclosure, the receiving service provider can break the SMS text message (m) down into a static template (m1) and variable fields (m2). Further, the receiving service provider can organize the message as a Merkle tree and commit the root hash of the Merkle tree to the digital ledger 202. The committed hash can be expressed as, C, in EXAMPLE EQUATION 1, where H(m1, m2) represents the hash of the static template and variable fields:

$$C=H(m1,m2) \qquad \text{EXAMPLE EQUATION 1}$$

Internally, the receiving service provider can query the digital ledger 202 for a list of templates and commit the template, T1, that matches to m1 in the digital ledger 202. Accordingly, the commitment can be expressed as (hash(m), T1). Further, the receiving service provider can generate a ZKP that the receiving service provider knows n1 and n2 such that H(n1,n2)=C and hash(T1)=hash(1).

Additionally, in response to the complaint, the scrubber 212-1 of the OAP 206-1 can generate a ZKP for the correctness of computation. More specifically, the ZKP can prove the correctness of the commitment computation. The consent data can be grounded (using hash commitments). This commitment can thus be used by the smart contract to match with the consent data that is already grounded to find the set of subscribers that have provided consent.

At operation 312, the TAP 206-4 or regulators 110, can validate the complaint by verifying the ZKPS for the template mapping and the proof of scrubbing. If the template ID for the SMS in the complaint matches the ZKP of the template mapping, and the ZKP of the proof of scrubbing matches the execution of scrubbing logic, the subscriber 106 has given consent, and the complaint is invalidated. Otherwise, there is no evidence of consent, and the complaint is validated.

Figure 4:
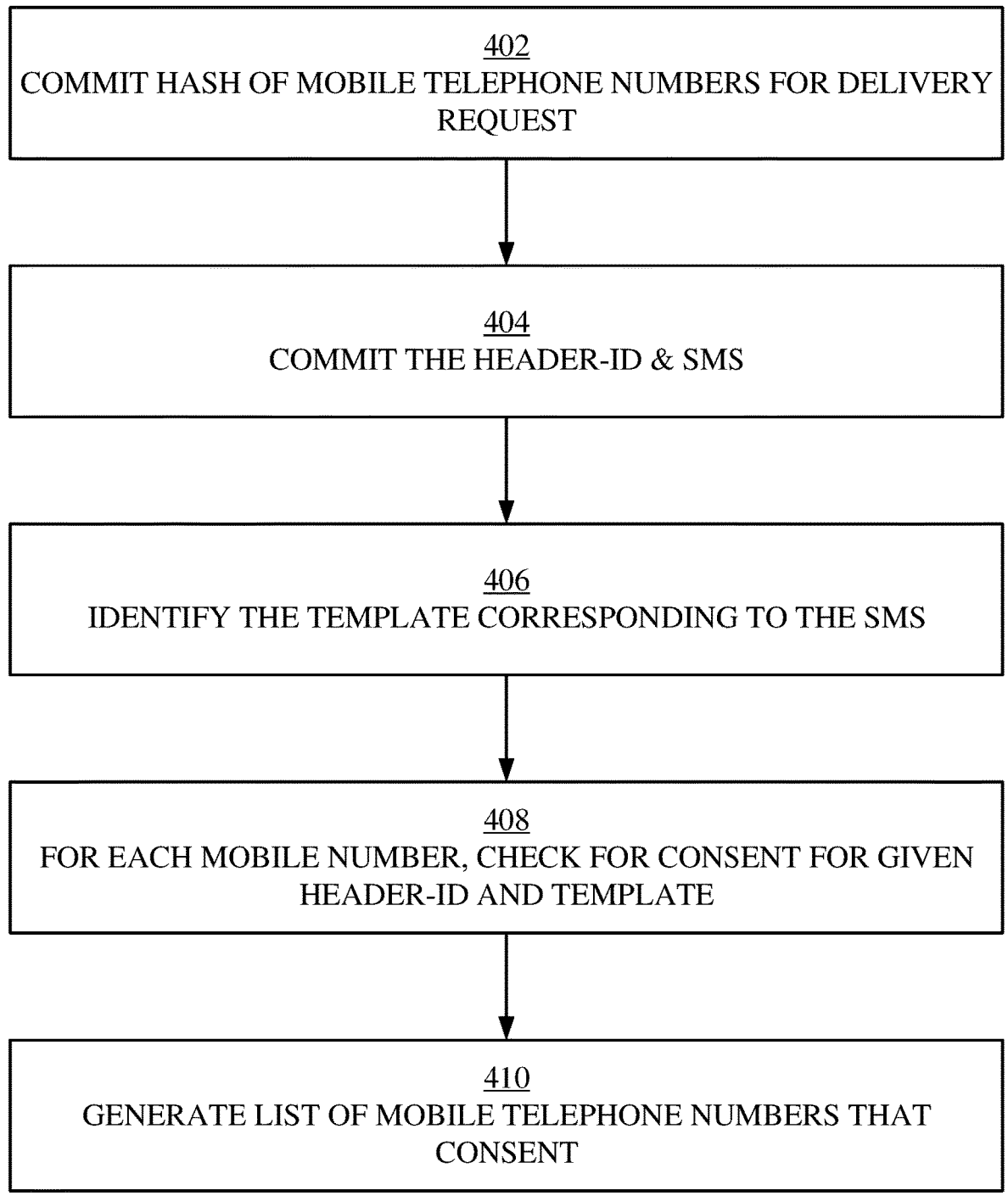
FIG. 4 is a process flow diagram of an example method for scrubbing a set of mobile telephone numbers, in accordance with some embodiments of the present disclosure.

FIG. 4 is a process flow diagram of an example method 400 for scrubbing a set of mobile telephone numbers, in accordance with some embodiments of the present disclosure. The scrubbing manager 116 and the scrubbers 212 can perform the method 400.

At operation 402, the scrubber 212-1 of the OAP 206-1 can commit a hash of the mobile telephone numbers for the delivery request. Committing the hash can include generating a hash of consent data using the private randomness of the scrubber 212-1. The scrubber 212-1 can generate this has over the digital ledger 202 in a global channel.

At operation 404, the scrubber 212-1 can commit the header-ID & SMS. Committing the header-ID & SMS can involve generating a hash.

At operation 406, the scrubber 212-1 can identify the template corresponding to the SMS. In some embodiments of the present disclosure, the SMS can include the template ID.

At operation 408, for each mobile telephone number, the scrubber 212-1 can check for subscriber consent for the header-ID and template. The SMS also includes the header-ID, which maps to the template.

At operation 410, the scrubber 212-1 can generate a list of mobile telephone numbers that consent to the communication for the indicated header-ID and template. The OAP 206-1 can thus share the list of mobile telephone numbers that consent with appropriate TAP 206-4, as indicated by a subscriber access provider mapping on the digital ledger 202.

In some embodiments of the present disclosure, the digital ledger 202 can include a smart contract that matches the committed hash of all the mobile telephone numbers against the OAP's hash of consent data with private randomness to identify the subset of mobile telephone numbers that give consent.

Figure 5A:
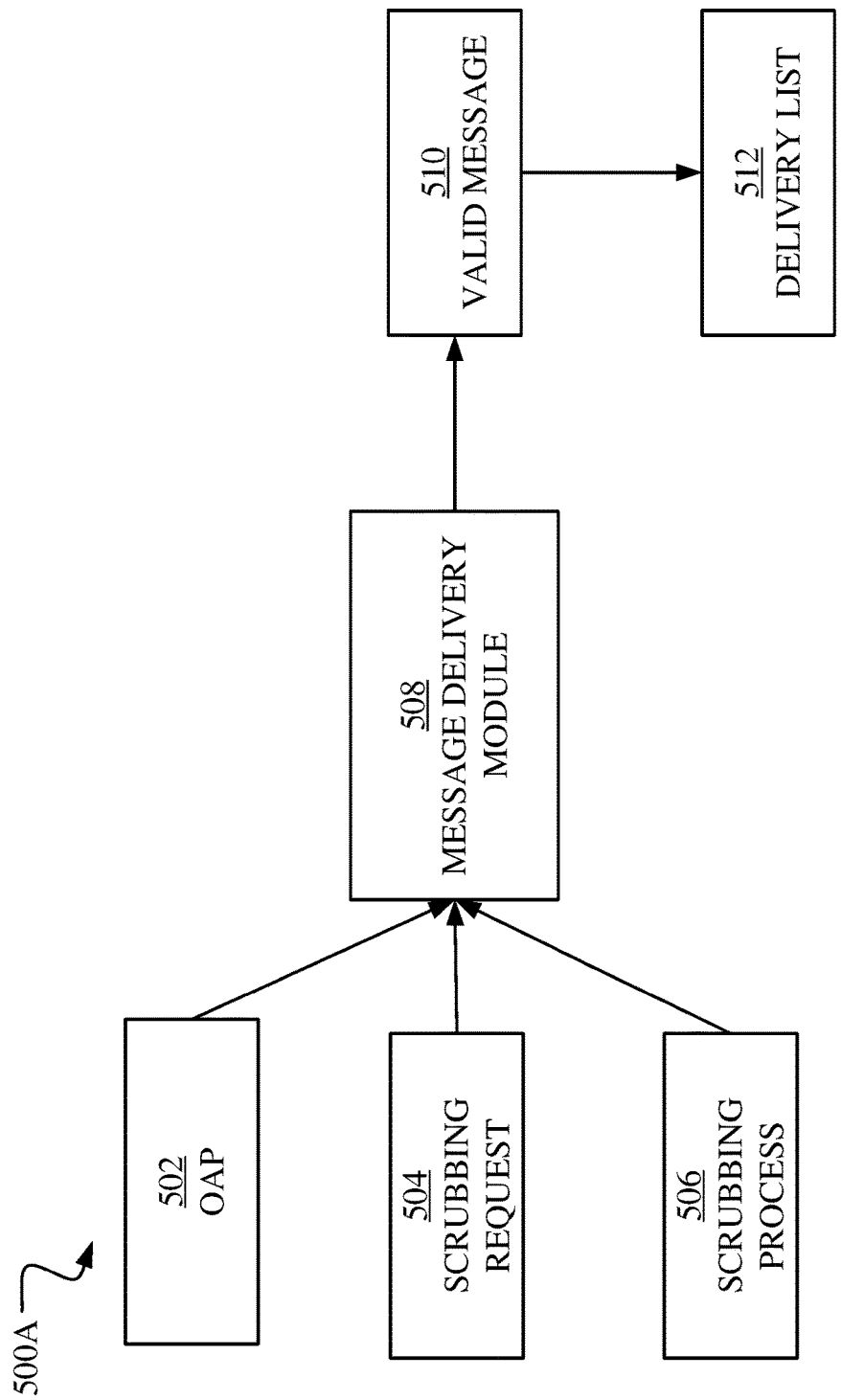
FIG. 5A is a block diagram of an example data flow diagram for message delivery with proof of scrubbing, in accordance with some embodiments of the present disclosure.

FIG. 5A is a block diagram of an example data flow diagram 500A for message delivery with proof of scrubbing, in accordance with some embodiments of the present disclosure. The data flow diagram 500A includes an OAP 502, scrubbing request 504, scrubbing process 506, message delivery module 508, valid message 510, and delivery list 512. The OAP is similar to the OAP 206-1; and, the scrubbing process 506 is similar to the method 400. In response to the scrubbing request from a messaging entity, e.g., messaging entity 204, the OAP 502 can perform the scrubbing process 506. The scrubbing request 504 can be similar to the delivery request described with respect to FIGS. 3 and 4. The scrubbing request 504 can thus include a message, header ID, template ID, and a list of mobile telephone numbers.

The message delivery module 508 can take the results from the scrubbing process 506 and determine, for each mobile telephone number, whether the message is valid at valid message process 510. Determining whether the message is valid for a mobile telephone number is based on whether the associated subscriber consents to the message for the header ID and template ID. Accordingly, the valid message process 510 can generate a delivery list 512 of mobile telephone numbers whose subscribers consent to the message delivery, and send the message to the terminating access providers of the mobile telephone numbers in the delivery list 512.

Figure 5B:
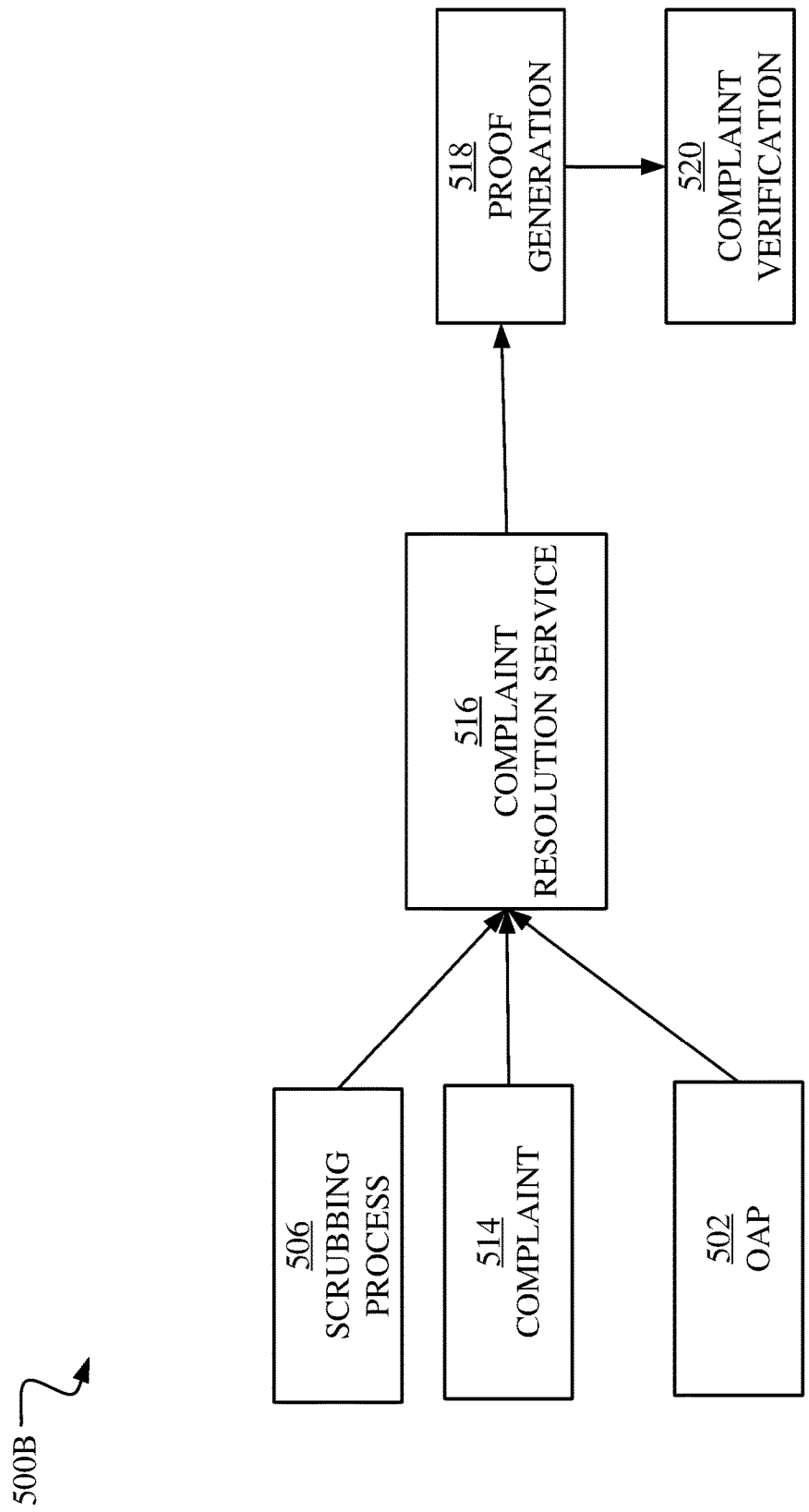
FIG. 5B is a block diagram of an example data flow diagram for automated complaint resolution of private data, in accordance with some embodiments of the present disclosure.

FIG. 5B is a block diagram of an example data flow diagram 500B for automated complaint resolution of private data, in accordance with some embodiments of the present disclosure. The data flow diagram 500 includes an OAP 502, scrubbing process 506, complaint 514, complaint resolution service 516, proof generation 518, and complaint verification 520. The OAP 502 can be similar to OAP 206-1 described with respect to FIG. 2. The scrubbing process 506 can be similar to the method 400 described with respect to FIG. 4. The complaint 514 can represent the data included in a complaint from a subscriber 106 about a UCC. Such data can include a message ID, mobile telephone number, data and time of the UCC, and the like.

The complaint resolution service 516 can trigger the proof generation 518, which may generate zero knowledge proofs for the template mapping and the proof of scrubbing. Additionally, the complaint resolution service 516 can analyze the generated zero knowledge proofs provided by the OAP 502 (for correct scrubbing), and by the receiving service provider (for correct mapping). Further, the complaint resolution service 516 can look at the actual scrubbing logic from the scrubbing process 506 that is pre-agreed by the consortium as input and verify the zero knowledge proofs. Additionally, the complaint resolution service 516 can generate a complaint verification 520 indicating whether the complaint 514 is valid.

Figure 6:
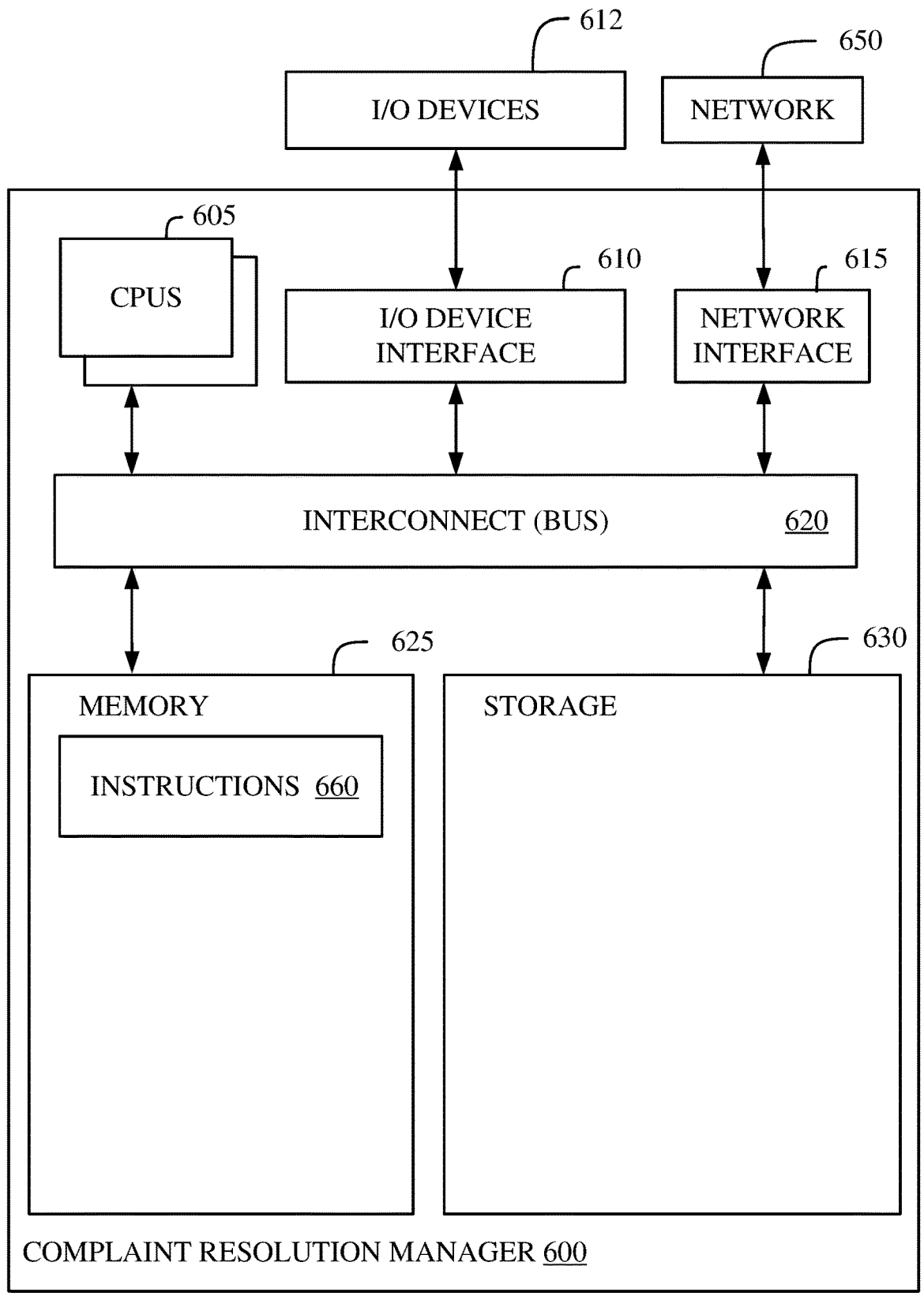
FIG. 6 is a block diagram of an example scrubbing manager, in accordance with some embodiments of the present disclosure.

FIG. 6 is a block diagram of an example complaint resolution manager 600, in accordance with some embodiments of the present disclosure. In various embodiments, the complaint resolution manager 600 is similar to the scrubbing manager 116 and can perform the method described in FIGS. 2-4 and/or the functionality discussed in FIGS. 1, 5A, and 5B. In some embodiments, the complaint resolution manager 600 provides instructions for the aforementioned methods and/or functionalities to a client machine such that the client machine executes the method, or a portion of the method, based on the instructions provided by the complaint resolution manager 600. In some embodiments, the complaint resolution manager 600 comprises software executing on hardware incorporated into a plurality of devices.

The complaint resolution manager 600 includes a memory 625, storage 630, an interconnect (e.g., BUS) 620, one or more CPUs 605 (also referred to as processors 605 herein), an I/O device interface 610, I/O devices 612, and a network interface 615.

Each CPU 605 retrieves and executes programming instructions stored in the memory 625 or the storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in various embodiments. In some embodiments, a CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random access memory (e.g., static random access memory (SRAM), dynamic random access memory (DRAM), or Flash). The storage 630 is generally included to be representative of a non-volatile memory, such as a hard disk drive, solid state device (SSD), removable memory cards, optical storage, and/or flash memory devices. Additionally, the storage 630 can include storage area-network (SAN) devices, the cloud, or other devices connected to the complaint resolution manager 600 via the I/O device interface 610 or to a network 650 via the network interface 615.

In some embodiments, the memory 625 stores instructions 660. However, in various embodiments, the instructions 660 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all, any of the methods described in FIGS. 2-4 and/or the functionality discussed in FIGS. 1, 5A, and 5B.

In various embodiments, the I/O devices 612 include an interface capable of presenting information and receiving input. For example, I/O devices 612 can present information to a listener interacting with complaint resolution manager 600 and receive input from the listener. The complaint resolution manager 600 is connected to the network 650 via the network interface 615. Network 650 can comprise a physical, wireless, cellular, or different network.

In some embodiments, the complaint resolution manager 600 can be a multi-user mainframe computer system, a single-user system, or a server computer or similar device that has little or no direct user interface but receives requests from other computer systems (clients). Further, in some embodiments, the complaint resolution manager 600 can be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary complaint resolution manager 600. In some embodiments, however, individual components can have greater or lesser complexity than as represented in FIG. 6, components other than or in addition to those shown in FIG. 6 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
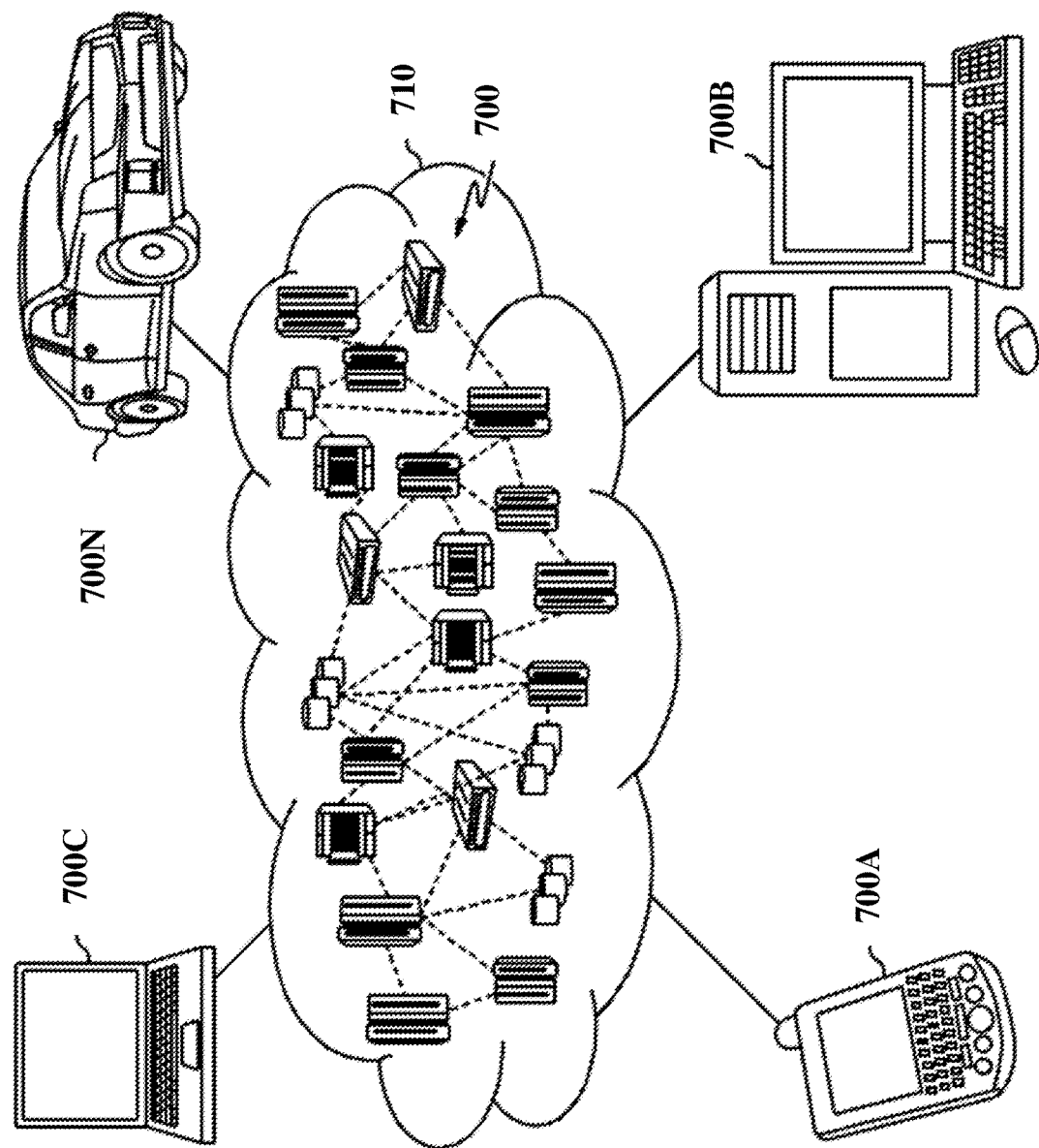
FIG. 7 is a cloud computing environment, in accordance with some embodiments of the present disclosure.

FIG. 7 is a cloud computing environment 710, according to some embodiments of the present disclosure. As shown, cloud computing environment 710 includes one or more cloud computing nodes 700. The cloud computing nodes 700 can perform the method described in FIGS. 2-4 and/or the functionality discussed in FIGS. 1, 5A, and 5B. Additionally, cloud computing nodes 700 can communicate with local computing devices used by cloud consumers, such as, for example, personal digital assistant (PDA) or cellular telephone 700A, desktop computer 700B, laptop computer 700C, and/or automobile computer system 700N. Further, the cloud computing nodes 700 can communicate with one another. The cloud computing nodes 700 can also be grouped (not shown) physically or virtually, in one or more networks, such as Private, Community, Public, or Hybrid clouds as described hereinabove, or a combination thereof. This allows cloud computing environment 710 to offer infrastructure, platforms and/or software as services for which a cloud consumer does not need to maintain resources on a local computing device. It is understood that the types of computing devices 700A-N shown in FIG. 7 are intended to be illustrative only and that computing nodes 700 and cloud computing environment 710 can communicate with any type of computerized device over any type of network and/or network addressable connection (e.g., using a web browser).

Figure 8:
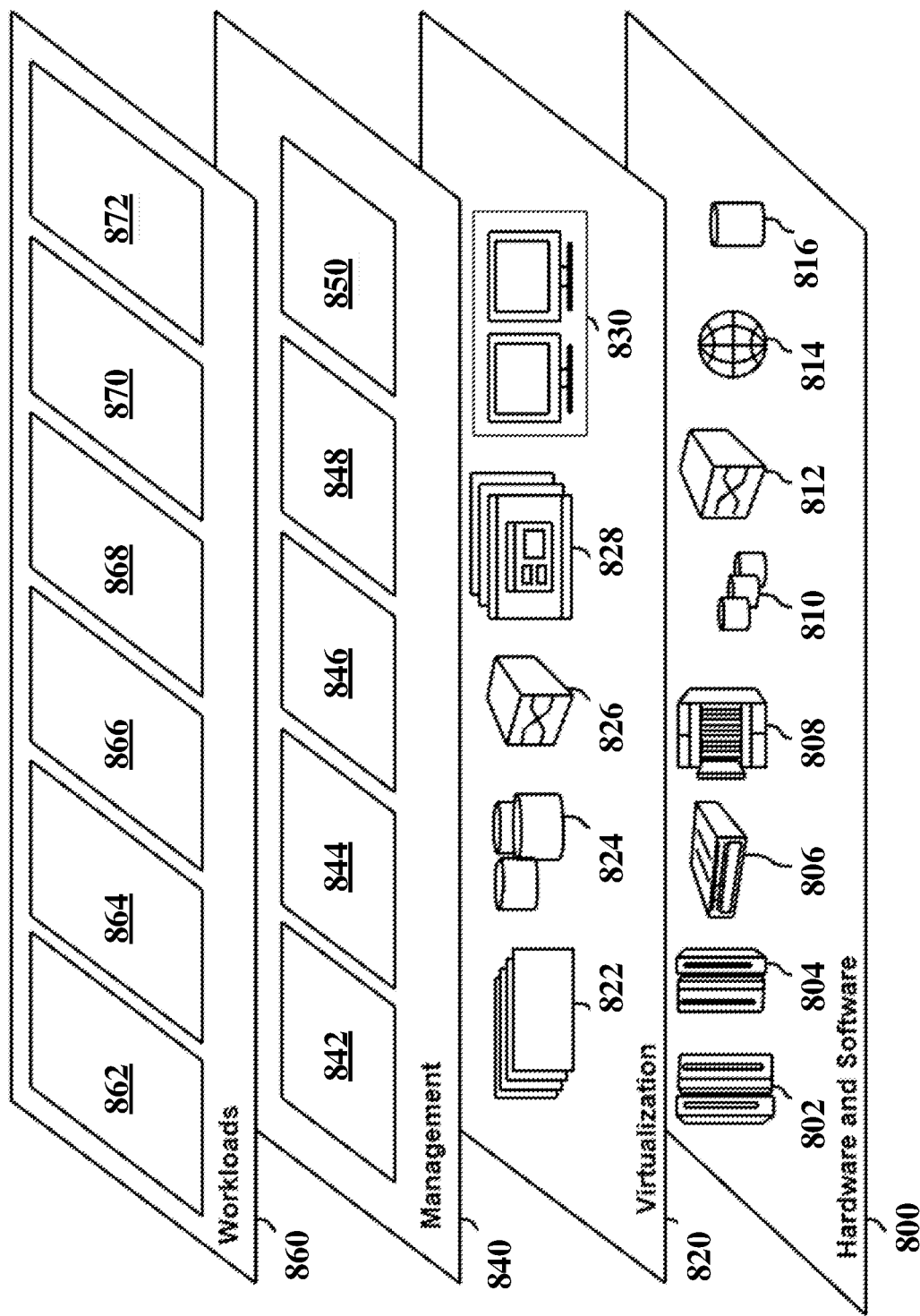
FIG. 8 is a set of functional abstraction model layers provided by the cloud computing environment, in accordance with some embodiments of the present disclosure.

FIG. 8 is a set of functional abstraction model layers provided by cloud computing environment 710 (FIG. 7), according to some embodiments of the present disclosure. It should be understood in advance that the components, layers, and functions shown in FIG. 8 are intended to be illustrative only and embodiments of the disclosure are not limited thereto. As depicted below, the following layers and corresponding functions are provided.

Hardware and software layer 800 includes hardware and software components. Examples of hardware components include: mainframes 802; RISC (Reduced Instruction Set Computer) architecture based servers 804; servers 806; blade servers 808; storage devices 810; and networks and networking components 812. In some embodiments, software components include network application server software 814 and database software 816.

Virtualization layer 820 provides an abstraction layer from which the following examples of virtual entities can be provided: virtual servers 822; virtual storage 824; virtual networks 826, including virtual private networks; virtual applications and operating systems 828; and virtual clients 830.

In one example, management layer 840 can provide the functions described below. Resource provisioning 842 provides dynamic procurement of computing resources and other resources that are utilized to perform tasks within the cloud computing environment. Metering and Pricing 844 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 846 provides access to the cloud computing environment for consumers and system administrators. Service level management 848 provides cloud computing resource allocation and management such that required service levels are met. Service level management 848 can allocate suitable processing power and memory to process static sensor data. Service Level Agreement (SLA) planning and fulfillment 850 provide pre-arrangement for, and procurement of, cloud computing resources for which a future requirement is anticipated in accordance with an SLA.

Workloads layer 860 provides examples of functionality for which the cloud computing environment can be utilized. Examples of workloads and functions which can be provided from this layer include: mapping and navigation 862; software development and lifecycle management 864; virtual classroom education delivery 866; data analytics processing 868; transaction processing 870; and complaint resolution manager 872.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, Java, Python or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
in response to a complaint about a message from a messaging entity addressed to a first plurality of mobile telephone numbers:
generating a first zero-knowledge proof that proves that a hash of a scrubbed plurality of mobile telephone numbers is computed correctly, wherein the scrubbed plurality of mobile telephone numbers consent to the message; and
generating a second zero-knowledge proof that proves that the message maps to the specific template identifier.

2. The method of claim 1, further comprising storing a first proof associated with the first zero-knowledge proof in a digital ledger, wherein the first proof proves that a plurality of subscribers associated with the scrubbed plurality of telephone numbers consent to message delivery associated with a specific template identifier.

3. The method of claim 2, further comprising determining whether the complaint is valid based on the first zero-knowledge proof and the second zero-knowledge proof.

4. The method of claim 3, wherein determining whether the complaint is valid does not disclose private consent data associated with each of the larger plurality of mobile telephone numbers.

5. The method of claim 1, wherein generating the scrubbed plurality of mobile telephone numbers comprises performing a scrubbing of the larger plurality of mobile telephone numbers for the specific template id.

6. The method of claim 5, wherein performing the scrubbing comprises:
committing a hash to the digital ledger of the larger plurality of mobile telephone numbers with a private randomness for an originating access provider of the messaging entity;
committing a header identifier and a short message service (SMS) text message to the digital ledger;
determining whether an associated subscriber consents to the message and the specific template identifier; and
generating the plurality of scrubbed mobile telephone numbers to include mobile telephone numbers associated with a subscriber consents to the message and the specific template identifier.

7. The method of claim 6, further comprising determining that the associated subscriber consents because the template identifier is associated with the message.

8. The method of claim 1, further comprising storing a second proof associated with the second zero-knowledge proof in the digital ledger, wherein the second proof proves that proves that the message maps to the specific template identifier.

9. A computer program product comprising one or more computer readable storage media, and program instructions collectively stored on the one or more computer readable storage media, the program instructions comprising instructions configured to cause one or more processors to perform a method comprising:
generating a scrubbed plurality of mobile telephone numbers that consent to a message from a messaging entity addressed to a larger plurality of mobile telephone numbers comprising the mobile telephone numbers based on a digital ledger that represents whether a plurality of subscribers associated with the larger plurality of telephone numbers consent to message delivery associated with a specific template identifier;
providing the message for delivery to the scrubbed plurality of mobile telephone numbers; and
in response to a complaint about the message:
generating a first zero-knowledge proof that proves that a hash of the scrubbed plurality of mobile telephone numbers is computed correctly; and
generating a second zero-knowledge proof that proves that the message maps to the specific template identifier.

10. The computer program product of claim 9, the method further comprising determining whether the complaint is valid based on the zero-knowledge proof that proves the message maps to the specific template identifier, and the zero-knowledge proof that proves that the hash of the scrubbed plurality of mobile telephone numbers is computed correctly.

11. The computer program product of claim 10, wherein determining whether the complaint is valid does not disclose private consent data associated with each of the larger plurality of mobile telephone numbers.

12. The computer program product of claim 9, wherein generating the scrubbed plurality of mobile telephone numbers comprises performing a scrubbing of the larger plurality of mobile telephone numbers for the specific template id.

13. The computer program product of claim 12, wherein performing the scrubbing comprises:
committing a hash to the digital ledger of the larger plurality of mobile telephone numbers with a private randomness for an originating access provider of the messaging entity;
committing a header identifier and a short message service (SMS) text message to the digital ledger;
determining whether an associated subscriber consents to the message and the specific template identifier; and
generating the plurality of scrubbed mobile telephone numbers to include mobile telephone numbers associated with a subscriber consents to the message and the specific template identifier.

14. The computer program product of claim 13, the method further comprising determining that the associated subscriber consents because the template identifier is associated with the message.

15. The computer program product of claim 9, the method further comprising storing a proof associated with the second zero-knowledge proof in the digital ledger, wherein the proof proves that proves that the message maps to the specific template identifier.

16. A system comprising:
one or more computer processing circuits; and
one or more computer-readable storage media storing program instructions which, when executed by the one or more computer processing circuits, are configured to cause the one or more computer processing circuits to perform a method comprising:
generating a scrubbed plurality of mobile telephone numbers that consent to a message from a messaging entity addressed to a larger plurality of mobile telephone numbers comprising the mobile telephone numbers based on a digital ledger that represents whether a plurality of subscribers associated with the larger plurality of telephone numbers consent to message delivery associated with a specific template identifier;
providing the message for delivery to the scrubbed plurality of mobile telephone numbers; and
in response to a complaint about the message:
generating a first zero-knowledge proof that proves that a hash of the scrubbed plurality of mobile telephone numbers is computed correctly;
generating a second zero-knowledge proof that proves that the message maps to the specific template identifier; and
determining whether the complaint is valid based on the zero-knowledge proof that proves the message maps to the specific template identifier, and the zero-knowledge proof that proves that the hash of the scrubbed plurality of mobile telephone numbers is computed correctly, wherein determining whether the complaint is valid does not disclose private consent data associated with each of the larger plurality of mobile telephone numbers.

17. The system of claim 16, wherein generating the scrubbed plurality of mobile telephone numbers comprises performing a scrubbing of the larger plurality of mobile telephone numbers for the specific template id.

18. The system of claim 17, wherein performing the scrubbing comprises:
committing a hash to the digital ledger of the larger plurality of mobile telephone numbers with a private randomness for an originating access provider of the messaging entity;
committing a header identifier and a short message service (SMS) text message to the digital ledger;
determining whether an associated subscriber consents to the message and the specific template identifier; and
generating the plurality of scrubbed mobile telephone numbers to include mobile telephone numbers associated with a subscriber consents to the message and the specific template identifier.

19. The system of claim 18, the method further comprising determining that the associated subscriber consents because the template identifier is associated with the message.

20. The system of claim 16, the method further comprising storing a proof associated with the second zero-knowledge proof in the digital ledger, wherein the proof proves that proves that the message maps to the specific template identifier.

* * * * *